United States Patent
Lee (10) Patent No.: US 6,717,977 B1
(45) Date of Patent: Apr. 6, 2004

(54) APPARATUS FOR ACQUIRING PSEUDO NOISE CODE AND DIRECT SEQUENCE CODE DIVISION MULTIPLE ACCESS RECEIVER INCLUDING THE SAME

(75) Inventor: Kang-min Lee, Seongnam (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/577,501

(22) Filed: May 24, 2000

(30) Foreign Application Priority Data

May 25, 1999 (KR) ........................................ 1999-18853

(51) Int. Cl.[7] .................................................. H04B 1/69
(52) U.S. Cl. ........................................ 375/147; 375/150
(58) Field of Search .............................. 375/130, 142, 375/144, 145, 148, 149, 150; 708/250, 252; 331/78

(56) References Cited

U.S. PATENT DOCUMENTS

| | | | | |
|---|---|---|---|---|
| 5,390,207 A | * | 2/1995 | Fenton et al. ............. | 375/149 |
| 5,414,729 A | * | 5/1995 | Fenton ...................... | 375/149 |
| 5,638,376 A | * | 6/1997 | Miki et al. ................ | 370/342 |
| 5,943,363 A | * | 8/1999 | Hanson et al. ............ | 375/150 |
| 6,029,267 A | * | 2/2000 | Simanapalli et al. ..... | 714/795 |
| 6,249,542 B1 | * | 6/2001 | Kohli et al. ............... | 375/150 |
| 6,347,113 B1 | * | 2/2002 | Hatch ......................... | 375/149 |
| 6,456,644 B1 | * | 9/2002 | Ramberg et al. .......... | 375/130 |
| 6,535,500 B1 | * | 3/2003 | Su ............................. | 370/342 |

FOREIGN PATENT DOCUMENTS

| WO | 99 24916 | 5/1999 | | |
|---|---|---|---|---|
| WO | WO9924916 | * | 5/1999 | ........... G06F/17/15 |

OTHER PUBLICATIONS

G. Povey, Jr. "Spread Spectrum PN Code Acquisition Using Hybrid Correlator Architectures", Wireless Personal, Sep. 1, 1998, pp. 151–164, vol. 8, No. 2, Communications, Kluwer Academic Publishers, NL.

* cited by examiner

Primary Examiner—Tesfaldet Bocure
Assistant Examiner—Qutub Ghulamali
(74) Attorney, Agent, or Firm—Burns Doane Swecker & Mathis, LLP (57) ABSTRACT

An apparatus for acquiring a pseudo noise (PN) code and a direct-sequence code division multiple access (DS-CDMA) receiver are provided. The apparatus for acquiring a pseudo noise (PN) code includes a PN code generator for generating K PN codes, a multiplexer for multiplying a received signal by +1 or −1 according to the value of a PN code selected to be a reference code among K PN codes and outputting the multiplication result, $2^{K-1}$ accumulators for accumulating the outputs of the multiplexer according to a predetermined control signal, a selector for outputting the control signal so that the output of the multiplexer can input to one of the accumulators according to (K−1) code values excluding the reference code, a programmable adder for adding the outputs of the accumulators to each other according to a predetermined regulation and outputting K correlation values, and a discriminator for outputting the PN code having a correlation value larger than a predetermined value among the K correlation values. It is possible to reduce the amount of operations by grouping codes during a hybrid search where K code phases are simultaneously searched by the DS-CDMA receiver and to simplify the structure of hardware.

8 Claims, 6 Drawing Sheets

APPARATUS FOR ACQUIRING PSEUDO NOISE CODE AND DIRECT SEQUENCE CODE DIVISION MULTIPLE ACCESS RECEIVER INCLUDING THE SAME

This application claims priority under 35 U.S.C. §§119 and/or 365 to 99-18853 filed in Korea on May 25, 1999; the entire content of which is hereby incorporated by Reference.

BACKGROUND OF THE INVENTION

1. Field of the Invention

The present invention relates to an apparatus for acquiring a pseudo noise (PN) code and a direct sequence code division multiple access (DS-CDMA) receiver including the same.

2. Description of the Related Art

CDMA is a type of spread-spectrum communication method, and is used for the interim standard (IS)-95 system, which is currently the mobile communication standard of Korea. Active research on CDMA is being currently made as the CDMA has been proposed for the international mobile telecommunication (IMT)-2000.

The CDMA system is popular since it has various advantages compared with other systems. In the CDMA system, it is not possible to distinguish noise from a transmission signal in a channel since the signal is spread using a PN code. Therefore, interception cannot be performed unless a correct code is known. Also, the CDMA system is resistant to intentional jamming due to the characteristic of the spread-spectrum system. A diversity effect is obtained in the CDMA system since a RAKE receiver is used in a multi-path channel.

The spread-spectrum method adopted in the IS-95 system is a direct sequence (DS) spread-spectrum. In the DS spread-spectrum, the spectrum is spread by multiplying the PN code, which has a duration (referred to as chip duration) much smaller than symbol duration, with a signal to be transmitted. Namely, the spectrum is spread by multiplying 64 binary PN codes with one binary symbol to be transmitted. One symbol is divided into 64 chips.

A receiver despreads a received DS spread-spectrum signal and detects symbols as they were prior to being spread. In order to despread the received DS spread-spectrum signal, it is important to acquire PN code synchronization. The synchronization of the PN code is realized by two steps of code acquisition and tracking and plays a very important role in determining the performance of the system.

In DS spread-spectrum, code acquisition can be performed by various methods. In the most commonly used method, the receiver generates the PN code using the same PN code generator as the PN code generator used in a transmitter, obtains partial correlation between the PN code and a received signal, compares the partial correlation value with a threshold value, and determines whether the code is acquired. Such a process is referred to as search.

A search range is one period of the PN code during the code acquisition. The search is performed until the phase of the PN code coincides with that of the received signal by obtaining the partial correlation value while changing the phase of the code in one period of the PN code. The one period of the PN code to be searched is referred to as an uncertainty region. In the IS-95 system, since the number of the PN code is $32768(=2^{15})$, 32768 code phases are to be searched in the worst case. The uncertainty region can be divided into several sections and those sections can be searched using different correlators. The search method is divided into a serial search method, a parallel search method, and a hybrid search method according to how many correlators are to be used for searching the uncertainty region.

In the serial search method, the entire uncertainty region is searched using one correlator. In the serial search method, the code is acquired by repeating processes of obtaining a correlation value with respect to one code phase, determining whether the code is acquired, and searching another phase when the code is not acquired. In the serial search method, hardware is much less complex than in the parallel and hybrid search methods, since only one correlator is necessary. However, much more time is spent on acquiring the code than in the other methods.

In the parallel search method, the code is acquired using the correlator in parallel with respect to the entire uncertainty region. In the parallel search method, much less time is spent on acquiring the code than in the serial search method, since the entire uncertainty region is searched at one time. However, since as many correlators as the number of the code are necessary, the complexity of hardware increases in proportion to the number of correlators.

In the hybrid search method where the serial search method and the parallel search method are combined, the uncertainty region is divided into several regions and is searched by several correlators. Namely, the correlators of the serial search method, where the regions to be searched are reduced, search the uncertainty regions in parallel. Therefore, in the hybrid search method, it is possible to reduce time spent on acquiring the code compared to in the serial search method and to reduce the complexity of hardware compared to in the parallel search method.

The structure of the correlator for obtaining the partial correlation value during the code acquisition is divided into an active correlator and a PN matched filter.

In the active correlator, the partial correlation value is obtained by multiplying one input data with one code generated by the PN code generator and integrating the multiplication result for an N-chip duration. That is to say, the PN code of N bits is integrated chip-by-chip.

Figure 1:
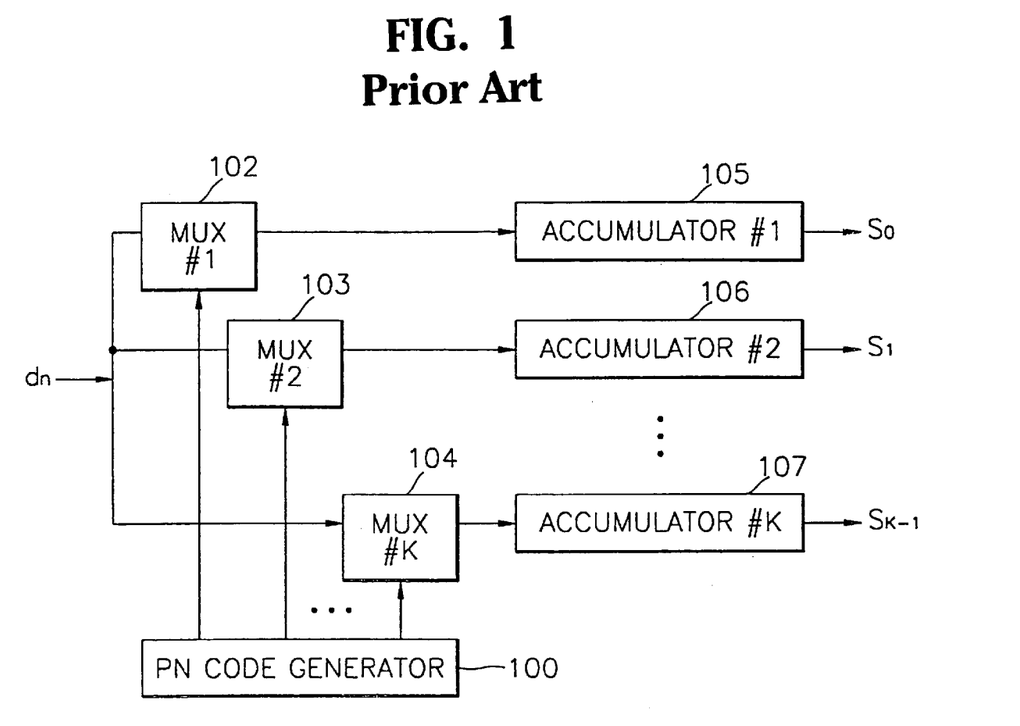
FIG. 1 shows the structure of a hybrid searching unit in which a conventional active correlator is used.

FIG. 1 shows the structure of a hybrid searching unit in which the conventional active correlator is used. The searching unit shown in FIG. 1 includes a PN code generator 100, a plurality of multiplexers MUXs 102, 103, and 104, and a plurality of accumulators 105, 106, and 107. As shown in FIG. 1, a hybrid searching unit searches the uncertainty region by using K different PN code phases at one time. The PN code generator 100 generates K PN codes having different phases. The PN code which is a binary code has a value of 0 or 1. The MUXs 102, 103, and 104 output $+d_n$ when the PN code is 0 and output $-d_n$ when the PN code is 1. Namely, the MUXs 102, 103, and 104 output $d_n$ when the PN code is 0 and output $-d_n$ when the PN code is 1 from input data $d_n$ received at a chip rate and the PN codes generated by the PN code generator 100. The output data of the MUXs 102, 103, and 104 are accumulated by the K accumulators 105, 106, and 107 for a certain time. The accumulated values become partial correlation values $S_0$ through $S_{K-1}$ with respect to K different PN code phases. The partial correlation values are finally compared with predetermined threshold values. Accordingly, it is determined whether the code is acquired.

However, this method has a problem in that a long time is spent on acquiring the code, since one partial correlation value is obtained with respect to the input data of N bits.

Figure 2A:
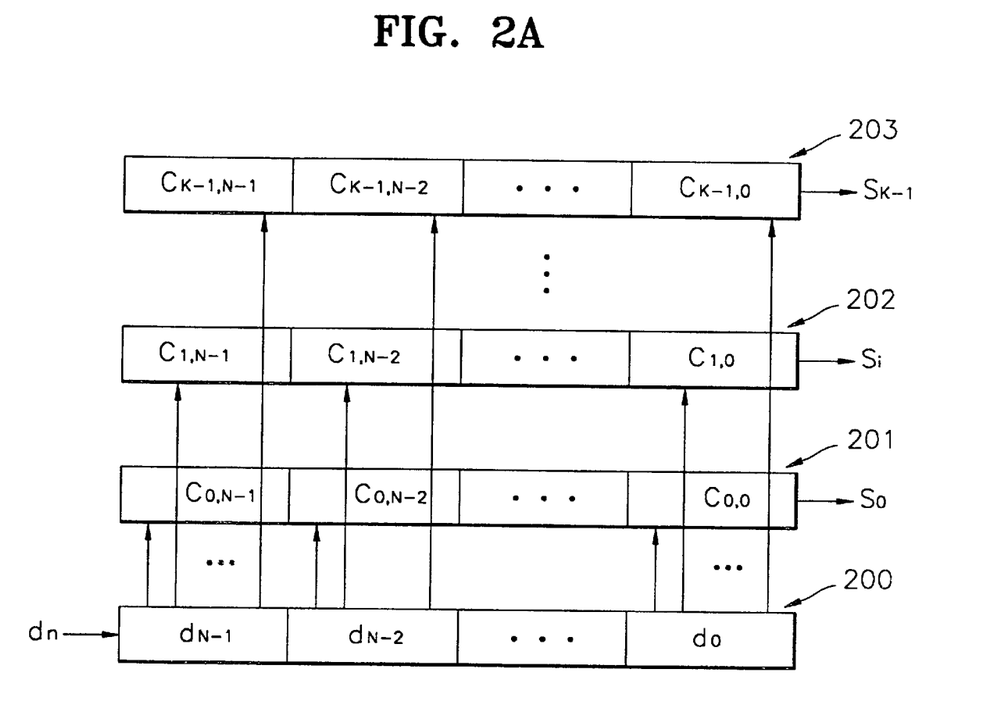
FIG. 2A shows the structure of a hybrid searching unit in which a conventional pseudo noise (PN) matched filter is used.

FIG. 2A shows the configuration of a hybrid searching unit in which the conventional PN matched filter is used. The hybrid searching unit shown in FIG. 2A includes N delayers 200, a first N-code storage portion 201, a second N-code storage portion 202, and a Kth N-code storage portion 203. As shown in FIG. 2A, delayers 200 delay the input data $d_n$ for the chip duration. The code storage portions 201, 202, and 203 store the PN codes in advance. The N input data output from the delayer 200 are multiplied with the respective codes stored in each code storage portion 201, 202, and 203 and the multiplication results are added to each other, thus obtaining the partial correlation values $S_0$ through $S_{K-1}$ are obtained. The partial correlation values are finally compared with predetermined threshold values. Accordingly, it is determined whether the code is acquired.

Figure 2B:
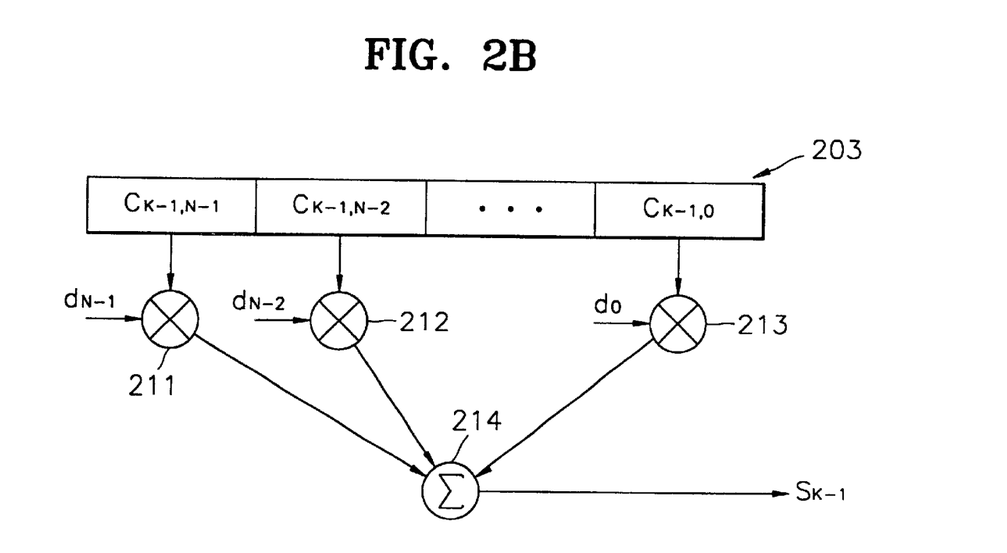
FIG. 2B shows the PN matched filter corresponding to a (K–1)th code storage portion among the PN matched filters shown in FIG. 2A in detail.

FIG. 2B shows the PN matched filter corresponding to a (K–1)th code storage portion among the PN matched filters shown in FIG. 2A. The PN matched filter shown in FIG. 2B includes a (K–1)th code storage portion 203, a plurality of multipliers 211, 212, and 213, and an adder 214.

The multipliers 211, 212, and 213 multiply the input data of N bits $d_{N-1}$ through $d_0$ input from the delayers 200 shown in FIG. 2A with N codes $c_{K-1,N-1}$ through $c_{K-1,0}$, respectively. The adder 214 adds the outputs of the multipliers 211, 212, and 213 to each other and outputs the partial correlation value $S_{K-1}$ with respect to the (K–1)th code phase.

Meanwhile this method has an advantage in that it is possible to reduce time spent on acquiring the code since one correlation value is obtained with respect to one input data, this method places a large burden on the hardware, since the PN codes must be previously stored and has a problem in that the performance of the searching unit is largely dependent on signal attenuation according to fading channels.

Also, when the code is acquired using the above-mentioned hybrid searching unit, the number of operations for obtaining the partial correlation values linearly increases in proportion to increases in the number K of code phases or the number of correlation sections increases.

SUMMARY OF THE INVENTION

To solve the above problem, it is an object of the present invention to provide an apparatus for acquiring a pseudo noise (PN) code by grouping K generated PN codes according to a predetermined regulation, determining one among the K PN codes to be a reference code, multiplying a received signal with the reference code in each group, adding the multiplication results to each other, and sharing the addition result when the partial correlation value between the received signal and the PN code is obtained in order to acquire the PN code included in the received signal and a direct-sequence code division multiple access (DS-CDMA) receiver including the same.

According to an aspect of the present invention, there is provided an apparatus for acquiring a pseudo noise (PN) code, comprising a PN code generator for generating K PN codes, a multiplexer for multiplying a received signal by +1 or –1 according to the value of a PN code selected to be a reference code among K PN codes and outputting the multiplication result, $2^{K-1}$ accumulators for accumulating the outputs of the multiplexer according to a predetermined control signal, a selector for outputting the control signal so that the output of the multiplexer can input to one of the accumulators according to (K–1) code values excluding the reference code, a programmable adder for adding the outputs of the accumulators to each other according to a predetermined regulation and outputting K correlation values, and a discriminator for outputting the PN code having a correlation value larger than a predetermined value among the K correlation values.

According to another aspect of the present invention, there is provided an apparatus for acquiring a PN code, comprising a PN code generator for generating PN codes of N-bit sequences having K different phases, a reference code storage portion for storing one of the K N-bit code sequences generated by the PN code generator, N taped delay lines for delaying a received signal N times, a multiplier for multiplying the output of the Nth tapped delay lines with the PN codes stored in the reference code register, a sub-summer for grouping generated PN codes according to a predetermined regulation, adding the outputs of the multiplier in each group to each other according to the groups to which the code bits stored in the reference code register belong and obtaining $2^{K-1}$ sub-sums, a programmable adder for adding the outputs of the sub-summer to each other according to a predetermined regulation and outputting K correlation values, and a discriminator for outputting the PN code having a correlation value larger than a predetermined threshold value among the K correlation values.

There is provided a direct-sequence code division multiple access (DS-CDMA) receiver for searching a PN code included in a received signal and despreading and demodulating the received signal using the searched PN code, comprising a PN code generator for generating PN codes of an N-bit sequence having K different phases, a code synchronizer by code grouping for grouping K PN codes generated by the PN code generator according to a predetermined regulation, determining one of the K PN codes to be a reference code, summing the multiplications of the received signal with the reference code in each group, determining a PN code having a correlation value larger than a threshold value among K correlation values obtained by adding the summed values according to a predetermined regulation to be the PN code included in the received signal, and synchronizing the phase of the determined PN code with the phase of the received signal, a despreader for despreading the received signal using the determined PN code, and a demodulator for demodulating the despread signal.

BRIEF DESCRIPTION OF THE DRAWINGS

The above object and advantages of the present invention will become more apparent by describing in detail a preferred embodiment thereof with reference to the attached drawings in which.

DESCRIPTION OF THE PREFERRED EMBODIMENTS

Hereinafter, embodiments of the present invention will be described in more detail with reference to the attached drawings.

Figure 3A:
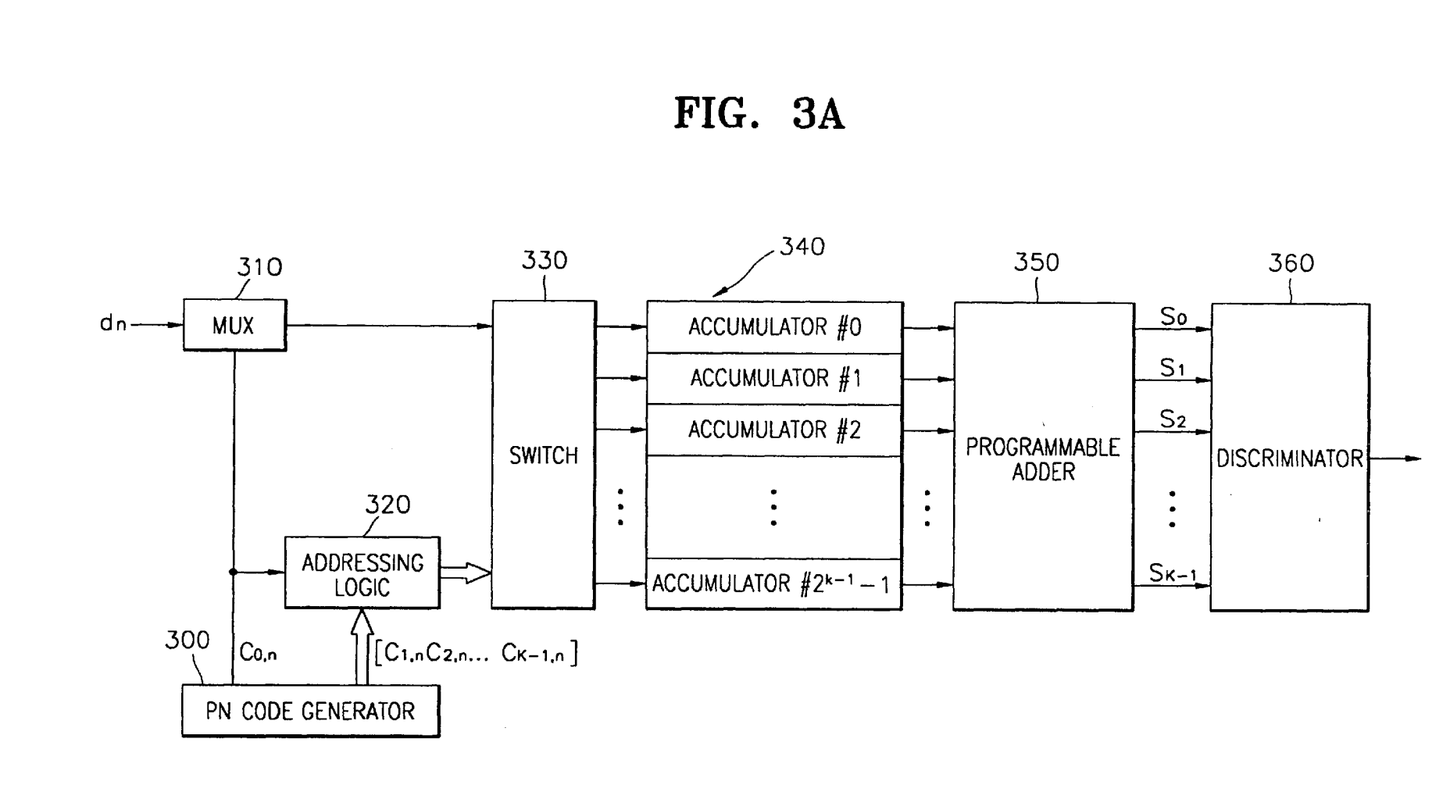
FIG. 3A is a block diagram of an apparatus for acquiring PN code according to the present invention.

FIG. 3A is a block diagram of an apparatus for acquiring a pseudo noise (PN) code according to the present invention. The apparatus for acquiring the PN code shown in FIG. 3A includes a PN code generator 300, a multiplexer (MUX) 310, an addressing logic 320, a switch 330, an accumulator 340, a programmable adder 350, and a discriminator 360.

The entire operation of the PN code acquiring apparatus shown in FIG. 3A will now be described. K codes, which can be generated by the PN code generator, are divided into groups according to a predetermined regulation. A sub-sum is obtained in each group by only one reference code among the K codes. Remaining (K−1) correlation values are obtained by sharing the sub-sum. K correlation values are compared with a threshold value. The PN code having the correlation value larger than the threshold value is determined to be the PN code of a received signal.

The PN code generator 300 generates PN codes $c_{0,n}$, $c_{1,n}$, . . . , and $c_{K-1,n}$ having K different phases with respect to one input data $d_n$ received at a predetermined chip rate.

The MUX 310 outputs $d_n$ when a reference code value is 0 and outputs $-d_n$ when the reference code value is 1, inputting the input data $d_n$ and the reference code to the MUX 310. At this time, the reference code is arbitrarily selected from among the PN codes generated by the PN code generator 300. In the present specification, $c_{0,n}$ is determined to be the reference code.

Figure 3B:
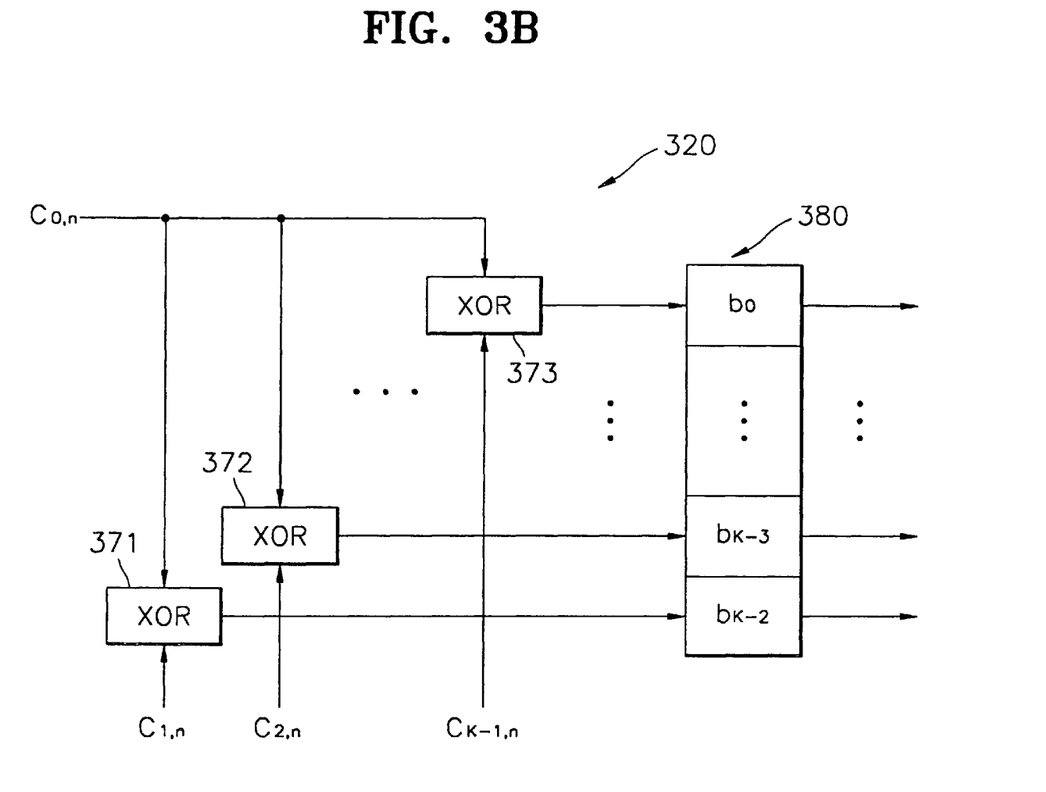
FIG. 3B is a block diagram showing the addressing logic of FIG. 3A in detail.

The addressing logic 320 designates the accumulator in which the output values of the MUX 310 are accumulated among $2^{K-1}$ accumulators 340. FIG. 3B is a block diagram showing the addressing logic 320 in detail. The addressing logic shown in FIG. 3B includes a plurality of exclusive OR gates (XOR) 371, 372, and 373 and a register 380 of (K−1) bits. The XOR gates 371, 372, and 373 perform exclusive OR operations, using the reference code $c_{0,n}$ and $c_{1,n}$, $c_{2,n}$, . . . , $c_{K-1,n}$ as inputs. Namely, the XORs 371, 372, and 373 output $[c_{1,n}, c_{2,n}, \ldots, c_{K-1,n}]$ when $c_{0,n}=0$ and output $[\bar{c}_{1,n}, \bar{c}_{2,n}, \ldots, \bar{c}_{K-1,n}]$ when $c_{0,n}=1$. As a result, the same address is generated with respect to the PN code which belongs to the same group to be described hereinafter. The register 380 stores the values output from the XORs 371, 372, and 373.

The switch 330 outputs the output values of the MUX 310 to one of the $2^{K-1}$ accumulators which is selected by regarding the values stored in the register 380 as an address to the accumulators. The accumulator 340 accumulates input values and outputs sub-sums. As a result, the sub-sums are obtained by accumulating the output values of the MUX 310 with respect to the PN codes which belong to the same group.

The programmable adder 350 outputs partial correlation values $S_0, \ldots, S_{K-1}$ with respect to K PN code phases by adding the sub-sums output from the accumulator 340 according to a predetermined regulation.

The discriminator 360 determines the PN code having the phase which makes the partial correlation value larger than the threshold value among the partial correlation values $S_0, \ldots, S_{K-1}$ to be the PN code of the received signal.

Processes of the addressing logic 320, the switch 330, the accumulator 340, and the programmable adder 350, which group the codes and calculate the partial correlation values, will now be described in detail.

The process of grouping the codes will now be described. Let's assume that the correlation values between the K codes and the received signals are obtained for an N-bit chip duration, while simultaneously searching the K code phases. The respective PN codes are represented by the following Equations when the PN codes are $C_0, C_1, \ldots,$ and $C_{K-1}$ and the nth component of $C_k$ ($0 \leq k \leq K-1$) is $c_{k,n}$ ($0 \leq n \leq N-1$).

$$C_0 = [\, C_{0,0} \quad C_{0,1} \quad \ldots \quad C_{0,N-1}\,] \tag{1}$$

$$C_1 = [\, C_{1,0} \quad C_{1,1} \quad \ldots \quad C_{1,N-1}\,]$$

$$\ldots$$

$$C_{K-1} = [\, C_{K-1,0} \quad C_{K-1,1} \quad \ldots \quad C_{K-1,N-1}\,]$$

A (K×N) matrix C is defined as follows.

$$C=[C_0 C_1 \ldots C_{K-1}]^T=[D_0 D_1 \ldots D_{N-1}] \tag{2}$$

The matrix C according to the PN codes will now be described, taking a case where K is 2 as an example. When K is 2, the number of cases of $D_n=(c_{0,n}, c_{1,n})$ is 4 and the respective cases can be expressed as (1,1), (−1,−1), (1,−1), and (−1,1). The four combinations are divided into two groups according to whether $c_{0,n}=c_{1,n}$ or $c_{0,n}=-c_{1,n}$. The group of $D_n$ which belongs to the former and the group of $D_n$ which belongs to the latter are referred to as $G_0$ and $G_1$, respectively.

For example, if the PN code sequences having two different phases are $C_0=\{1\ 1\ -1\ 1\ -1\}$ and $C_1=\{1\ 1\ 1\ -1\ -1\}$, respectively, and input data sequences are $d_0, d_1, \ldots,$ and $d_4$, the partial correlation values $S_0$ and $S_1$ with respect to the respective code phases are obtained as follows.

$$S_0 = (d_0 + d_1 - d_4) + (-d_2 + d_3) = S_{00} + S_{01} \tag{3}$$

$$S_1 = (d_0 + d_1 - d_4) - (-d_2 + d_3) = S_{00} - S_{01}$$

Here, it is noted that $S_{00}$ is a sub-sum according to input data multiplied with codes which belong to $G_0$ among the elements of $C_0$, and that $S_{01}$ is a sub-sum according to input data multiplied with the codes which belong to $G_1$. Therefore, once the sub-sum is obtained with respect to only one between the codes of the two phases, it is possible to obtain the partial correlation value in another phase using the obtained sub-sum.

When K is 3, the number of code groups which can be divided according to the pattern of $D_n$ is $2^2=4$. The respective groups are as follows: G0: $c_{0,n}=c_{1,n}=c_{2,n}$, G1: $c_{0,n}=c_{1,n}=-c_{2,n}$, G2: $c_{0,n}=-c_{1,n}=c_{2,n}$, and G3: $-c_{0,n}=c_{1,n}=c_{2,n}$. Namely, (1,1,1) and (−1,−1,−1) belong to $G_0$. (1,1,−1) and (−1,−1,1) belong to $G_1$. Also, (1,−1,1) and (−1,1,−1) belong to $G_2$, and (−1,1,1) and (1,−1,−1) belong to $G_3$. For example, the code sequences shown in Table 1 are generated.

TABLE 1

|  | $D_0$ | $D_1$ | $D_2$ | $D_3$ | $D_4$ | $D_5$ | $D_6$ | $D_7$ |
|---|---|---|---|---|---|---|---|---|
| $C_0$ | 1 | 1 | 1 | 1 | −1 | −1 | −1 | 1 |
| $C_1$ | 1 | −1 | −1 | −1 | 1 | −1 | −1 | 1 |
| $C_2$ | 1 | −1 | 1 | −1 | −1 | 1 | −1 | −1 |

In the patterns of the respective columns, $D_0$ and $D_6$ belong to $G_0$, $D_5$ and $D_7$ belong to $G_1$, $D_2$ and $D_4$ belong to $G_2$, and $D_1$ and $D_3$ belong to $G_3$. When the partial correlation value in the kth phase code is referred to as Sk, the partial correlation values with respect to three code phases can be obtained as follows.

$$S_0 = \quad (4)$$
$$(d_0 - d_6) + (-d_5 + d_7) + (d_2 - d_4) + (d_1 + d_3) = S_{00} + S_{01} + S_{02} + S_{03}$$
$$S_1 = (d_0 - d_6) + (-d_5 + d_7) - (d_2 - d_4) - (d_1 + d_3) =$$
$$S_{00} + S_{01} - S_{02} - S_{03}$$
$$S_2 = (d_0 - d_6) - (-d_5 + d_7) + (d_2 - d_4) - (d_1 + d_3) =$$
$$S_{00} - S_{01} + S_{02} - S_{03}$$

Here, $S_{00}$ through $S_{03}$ are sub-sums of the respective groups obtained from the elements of $C_0$ which belong to $G_0$ through $G_3$. In the case in which K is 3, once as many sub-sums as the number of code groups are obtained with respect to a reference code, it is possible to obtain partial correlation values in all the code phases using the sub-sums.

When K is 4, the number of available code groups is $2^{K-1}=8$. When the sub-sums obtained from the code sequences of $C_0$ which belong to $G_0$ through $G_7$ are $S_{00}$ through $S_{07}$, the partial correlation values $S_0$ through $S_3$ with respect to the code phases from the 0th code phase to the third code phase are obtained as follows.

$$S_0 = S_{00} + S_{01} + S_{02} + S_{03} + S_{04} + S_{05} + S_{06} + S_{07} \quad (5)$$
$$S_1 = S_{00} + S_{01} + S_{02} + S_{03} - S_{04} - S_{05} - S_{06} - S_{07}$$
$$S_2 = S_{00} + S_{01} - S_{02} - S_{03} + S_{04} + S_{05} - S_{06} - S_{07}$$
$$S_3 = S_{00} - S_{01} + S_{02} - S_{03} + S_{04} - S_{05} + S_{06} - S_{07}$$

When K is 4, the partial correlation values with respect to the respective codes can be obtained by combining the eight sub-sums obtained from a reference code with each other. In the process of combining the sub-sums with each other, interim calculation results can be shared as follows.

$$S_0 = (S_{00} + S_{01} + S_{02} + S_{03}) + (S_{04} + S_{05} + S_{06} + S_{07}) = S_{000} + S_{001} \quad (6)$$
$$S_1 = (S_{00} + S_{01} + S_{02} + S_{03}) - (S_{04} + S_{05} + S_{06} + S_{07}) = S_{000} - S_{001}$$

Namely, it is possible to share the sub-sums $S_{000}$ and $S_{001}$ of the sub-sums in the process of adding the sub-sums to each other. When the final partial correlation value is obtained by combining the sub-sums with each other and adding the sub-sums to each other, the following matrix is defined when K is 4.

$$S = \begin{bmatrix} S_{00} & S_{01} & S_{02} & S_{03} & S_{04} & S_{05} & S_{06} & S_{07} \\ S_{00} & S_{01} & S_{02} & S_{03} & -S_{04} & -S_{05} & -S_{06} & -S_{07} \\ S_{00} & S_{01} & -S_{02} & -S_{03} & S_{04} & S_{05} & -S_{06} & -S_{07} \\ S_{00} & -S_{01} & S_{02} & -S_{03} & S_{04} & -S_{05} & S_{06} & -S_{07} \end{bmatrix} \quad (7)$$

The elements of the matrix S are values which are added to each other when the partial correlation values with respect to the respective code phases are obtained, the combinations of the respective sub-sums including signs. Namely, the results obtained by adding the elements of first through fourth rows of the matrix S to each other in a row direction are respectively $S_0$ through $S_3$. The number of rows of the matrix S is equal to the number of code phases to be searched, which is 4. The number of columns is equal to the number of sub-sums, which is 8.

At this time, the combination of the elements of the matrix S in the column direction satisfies each condition under which $D_n$ is grouped into $G_0$ through $G_7$ at only one time. Namely, the combinations of the elements in the first column of the matrix S are ($S_{00}=S_{00}=S_{00}=S_{00}$), which satisfy the condition for belonging to $G_0$. The combinations of the elements arranged in the second column are ($S_{01}=S_{01}=S_{01}=-S_{01}$), which satisfy the condition for belonging to $G_1$. Therefore, the combinations of the elements of the eight columns can be one-to-one mapped to $G_0$ through $G_7$.

When two arbitrary rows of the matrix S are selected and the elements of the two rows are compared with each other, four elements among the eight elements included in one row are equal to four elements among the eight elements included in the other row and the sign of the other four elements in the one row is opposite to the sign of the other four elements in the other row. For example, when the first row is compared with the second row in the matrix shown in Equation 7, the elements of the first through fourth columns in the first row are equal to the elements of the first through fourth columns in the second row and the sign of the elements of the fifth through eighth columns in the first row is opposite to the sign of the elements of the fifth through eighth columns in the second row.

When the matrix which shows only the signs of the elements of the matrix S is defined as S', each column of the matrix S' can be one-to-one mapped to the binary numbers of 0 through 7 when "+" and "−" are converted into "0" and "1", respectively, as shown in the following Equation.

$$S' = \begin{bmatrix} + & + & + & + & + & + & + & + \\ + & + & + & + & - & - & - & - \\ + & + & - & - & + & + & - & - \\ + & - & + & - & + & - & + & - \end{bmatrix} = \begin{bmatrix} 0 & 0 & 0 & 0 & 0 & 0 & 0 & 0 \\ 0 & 0 & 0 & 0 & 1 & 1 & 1 & 1 \\ 0 & 0 & 1 & 1 & 0 & 0 & 1 & 1 \\ 0 & 1 & 0 & 1 & 0 & 1 & 0 & 1 \end{bmatrix} = [0 \ 1 \ 2 \ 3 \ 4 \ 5 \ 6 \ 7] \quad (8)$$

Therefore, comparing the elements of each row with each other involves arraying 0 through 7 using the binary system and comparing the respective digits with each other. In general, when 0 through $2^{K-1}-1$ among the binary numbers that can be represented by K digits due to the characteristics of the binary numbers, that is, when all numbers that can be represented when the uppermost digit is 0 are arrayed and two arbitrary digits are compared with each other among K digits, half of $2^{K-1}$ digits are equal to each other and the other half are not equal to each other.

Therefore, two different arbitrary phases can share the sub-sums again in obtaining K partial correlation values when the characteristic of the matrix S is used. As a result, it is possible to reduce the amount of operations one more time. For example, when K is 4, four partial correlation values are obtained as follows.

$$S_0 = (S_{00} + S_{01} + S_{02} + S_{03}) + (S_{04} + S_{05} + S_{06} + S_{07}) = S_{000} + S_{001} \quad (9)$$
$$S_1 = (S_{00} + S_{01} + S_{02} + S_{03}) - (S_{04} + S_{05} + S_{06} + S_{07}) = S_{000} - S_{001}$$
$$S_2 = (S_{00} - S_{03} + S_{04} - S_{07}) + (S_{01} - S_{02} + S_{05} - S_{06}) = S_{002} + S_{003}$$
$$S_3 = (S_{00} - S_{03} + S_{04} - S_{07}) - (S_{01} + S_{02} + S_{05} - S_{06}) = S_{002} - S_{003}$$

As shown in Equation 9, $S_{000}$ and $S_{001}$ can be shared when $S_0$ and $S_1$ are obtained and $S_{002}$ and $S_{003}$ can be shared when $S_2$ and $S_3$ are obtained.

Figure 4:
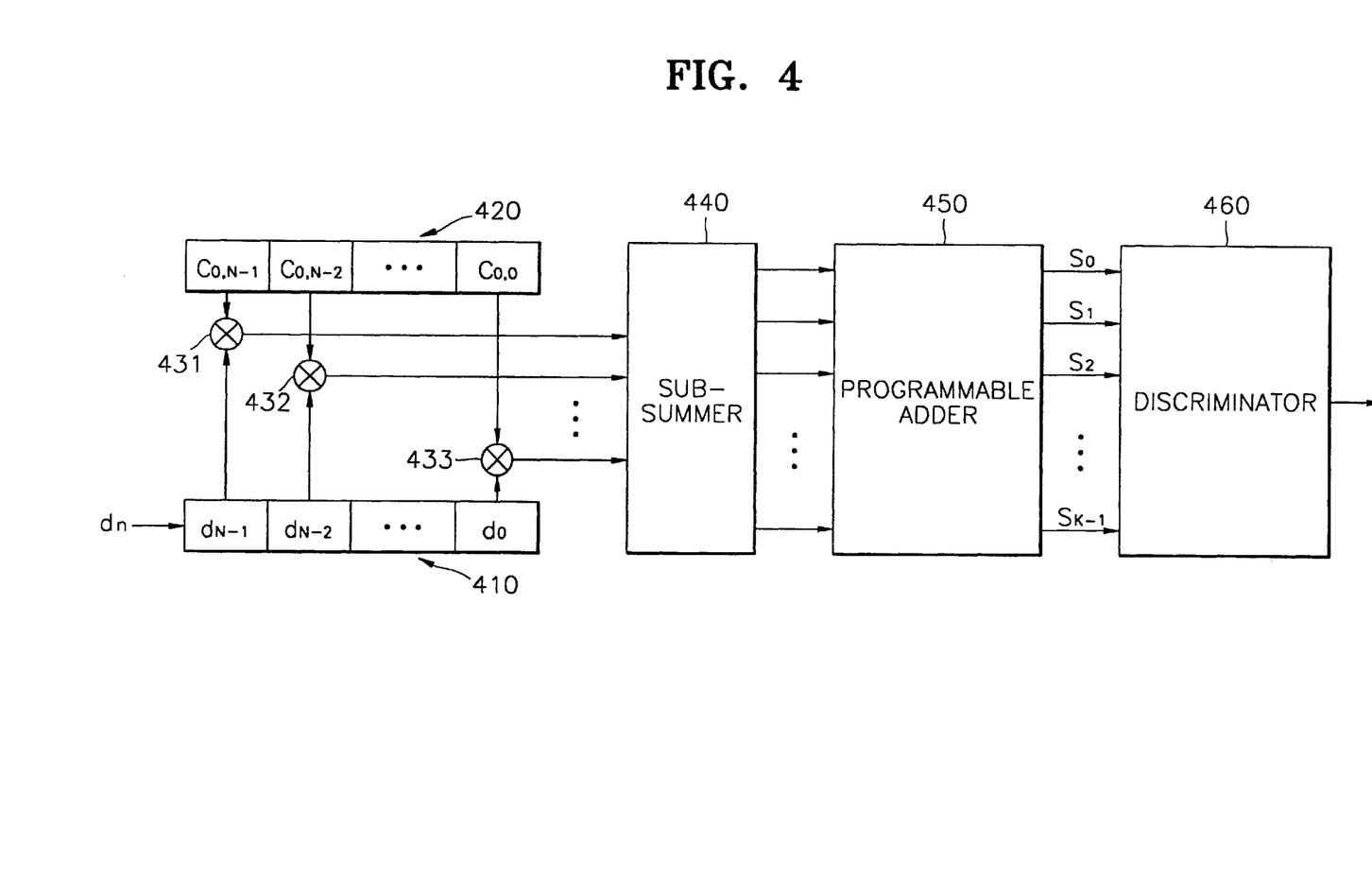
FIG. 4 is a block diagram of the apparatus for acquiring the PN code according to the present invention.

FIG. 4 is a block diagram of an apparatus for acquiring a PN code according to the present invention. A PN matched filter is used for the PN code acquiring apparatus, which includes a tapped delay line 410, a reference code storage portion 420, a plurality of multipliers 431, 432, and 433, a sub-summer 440, a programmable adder 450, and a discriminator 460.

The tapped delay line 410 delays and stores input data $d_n$ received at a predetermined chip rate.

The reference code storage portion 420 stores PN code sequences of N bits generated by a PN code generator (not shown). This is because it is possible to obtain a sub-sum with respect to one PN code sequence $[c_{0,0} \ c_{0,1} \ldots c_{0,N}]$ by dividing N code bits into $2^{K-1}$ groups.

The multipliers 431, 432, and 433 multiply the values stored in the tap delay line 410 with the value stored in the reference code storage portion 420.

The sub-summer 440 sums the N outputs of the multipliers 431, 432, and 433 in each group according to the groups to which the code bits stored in the reference code storage portion 420 belong and obtains $2^{K-1}$ sub-sums.

The programmable adder 450 adds the sub-sums output from the sub-summer 440 to each other according to a predetermined regulation and outputs the partial correlation values $S_0, \ldots,$ and $S_{K-1}$ with respect to the K PN code phases.

The discriminator 460 determines the PN code having the phase which makes the partial correlation values larger than the threshold value among the output partial correlation values $S_0, \ldots,$ and $S_{K-1}$ to be the PN code of the received signal.

Results of generating four PN code sequences having different phases, whose lengths are 20 bits, using the shift register used for the forward link of the IS-95 system are shown in Table 2. Here, K is 4 and N is 20. Input data are represented as $d_0$ through $d_{19}$. The partial correlation values are obtained by correlating for 20 chip duration with respect to four code phases. The lowest row of Table 2 denotes the number of groups to which $D_n$ belong.

$D_n$ is grouped by code patterns in order to obtain the $2^{4-1}=8$ sub-sums. When a reference PN code is $C_0$, the sub-sums are represented as follows in the respective code groups.

$$G_0: S_{00} = d_{18} \quad (10)$$
$$G_1: S_{01} = -d_0 + d_1 - d_7$$
$$G_2: S_{02} = d_{11} - d_{14} + d_{15} - d_{17}$$
$$G_3: S_{03} = d_2 - d_{10}$$
$$G_4: S_{04} = -d_3 - d_9$$
$$G_5: S_{05} = d_6 - d_{16}$$
$$G_6: S_{06} = d_4 - d_5$$
$$G_7: S_{07} = -d_8 + d_{12} - d_{13} + d_{19}$$

The number of additions required for obtaining the sub-sums represented in Equation 10 is 20. After sharing the sub-sum of the sub-sums of two pairs of code phases, four partial correlation values are represented as follows.

$$S_0 = (S_{00} + S_{01} + S_{02} + S_{03}) + (S_{04} + S_{05} + S_{06} + S_{07}) = S_{000} + S_{001} \quad (11)$$
$$S_1 = (S_{00} + S_{01} + S_{02} + S_{03}) - (S_{04} + S_{05} + S_{06} + S_{07}) = S_{000} - S_{001}$$
$$S_2 = (S_{00} - S_{03} + S_{04} - S_{07}) + (S_{01} - S_{02} + S_{05} - S_{06}) = S_{002} + S_{003}$$
$$S_3 = (S_{00} - S_{03} + S_{04} - S_{07}) - (S_{01} + S_{02} + S_{05} - S_{06}) = S_{002} - S_{003}$$

The number of additions at this stage is 24. Therefore, 44 additions are required when the partial correlation values with respect to four code phases are obtained by the method according to the present invention. 4×20=80 additions are required according to the conventional method.

Figure 5:
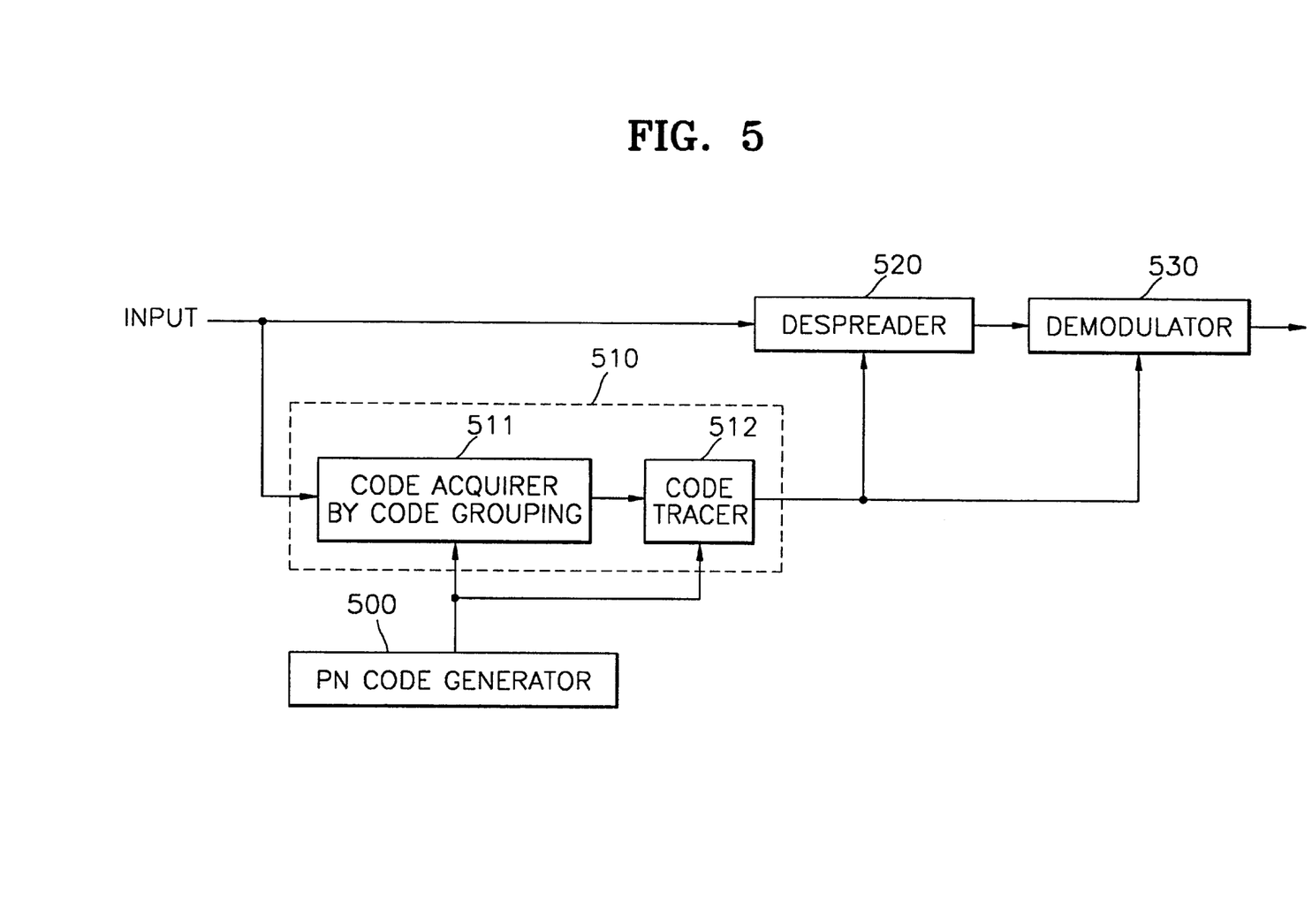
FIG. 5 is a block diagram of a DS-CDMA receiver according to the present invention.

FIG. 5 is a block diagram showing a DS-CDMA receiver according to the present invention. The DS-CDMA shown in FIG. 5 includes a PN code generator 500, a code synchronizer by code grouping 510, a despreader 520, and a demodulator 530.

The PN code generator 500 generates K PN codes having different phases with respect to input data $d_n$ received at a predetermined chip rate.

The code synchronizer 510 acquires the PN code included in a received signal from a correlation value obtained by correlating a code having K different phases generated by the PN code generator 500 for an N-bit chip duration and the received signal, and acquires PN code synchronization by controlling the phase of the acquired PN code.

The despreader 520 despreads a received signal by using the PN code whose synchronization is controlled by the code synchronizer 510.

The demodulator 530 demodulates the signal despread by the despreader 520 corresponding to the modulation method of a transmitter.

TABLE 2

| | $D_0$ | $D_1$ | $D_2$ | $D_3$ | $D_4$ | $D_5$ | $D_6$ | $D_7$ | $D_8$ | $D_9$ | $D_{10}$ | $D_{11}$ | $D_{12}$ | $D_{13}$ | $D_{14}$ | $D_{15}$ | $D_{16}$ | $D_{17}$ | $D_{18}$ | $D_{19}$ |
|---|---|---|---|---|---|---|---|---|---|---|---|---|---|---|---|---|---|---|---|---|
| $C_0$ | -1 | 1 | 1 | 1 | 1 | -1 | 1 | -1 | -1 | -1 | -1 | 1 | 1 | -1 | -1 | 1 | -1 | -1 | 1 | 1 |
| $C_1$ | -1 | 1 | 1 | -1 | -1 | 1 | -1 | -1 | 1 | 1 | -1 | 1 | -1 | 1 | -1 | 1 | 1 | -1 | 1 | -1 |
| $C_2$ | -1 | 1 | -1 | 1 | -1 | 1 | 1 | -1 | 1 | -1 | 1 | -1 | -1 | 1 | 1 | -1 | -1 | 1 | 1 | -1 |
| $C_3$ | 1 | -1 | -1 | 1 | 1 | -1 | -1 | 1 | 1 | -1 | 1 | 1 | -1 | 1 | -1 | 1 | 1 | -1 | 1 | -1 |
| n of $G_n$ | 1 | 1 | 3 | 4 | 6 | 6 | 5 | 1 | 7 | 4 | 3 | 2 | 7 | 7 | 2 | 2 | 5 | 2 | 0 | 7 |

The code synchronizer 510 includes a code acquirer by code grouping 511 and a code tracer 512.

The code acquirer 511 divides K codes generated by the PN code generator 500, into groups according to a predetermined regulation and obtains a sub-sum with respect to the received signal according to the group to which the generated code belongs. After obtaining K correlation values by sharing the sub-sum, the PN code having the correlation value larger than the predetermined threshold value is determined to be the PN code of the received signal.

The code tracer 512 controls the phase of the PN code determined by the code acquirer 511 and synchronizes the PN code with the received signal.

According to the present invention, it is possible to reduce the amount of operations by grouping codes during a hybrid search where K code phases are simultaneously searched by the DS-CDMA receiver, to thus simplify the structure of hardware. For example, in the case of the PN matched filter, when the correlation is obtained for N-chip duration, K×N multiplications are required for one input data item in the conventional technology. However, only K multiplications are required according to the present invention. In the conventional technology, as the number K of code phases to be searched increases, the amount of operations and the complexity of hardware linearly increase in proportion to k. However, according to the present invention, the amount of operations is smaller and the structure of hardware is simpler than the conventional technology, regardless of K.

What is claimed is:

1. An apparatus for acquiring a pseudo noise (PN) code, comprising:
   a PN code generator for generating K PN codes;
   a multiplexer for multiplying a received signal by +1 or −1 according to the value of a PN code selected to be a reference code among K PN codes and outputting the multiplication result;
   $2^{K-1}$ accumulators for accumulating the outputs of the multiplexer according to a predetermined control signal;
   a selector for outputting the control signal so that the output of the multiplexer can input to one of the accumulators according to (K−1) code values excluding the reference code;
   a programmable adder for adding the outputs of the accumulators to each other according to a predetermined regulation and outputting K correlation values; and
   a discriminator for outputting the PN code having a correlation value larger than a predetermined value among the K correlation values.

2. The apparatus of claim 1, wherein the selector comprises:
   (K−1) exclusive OR operators for performing an exclusive OR operation on the reference code and the (K−1) codes;
   a register of (K−1) bits for storing the outputs of the exclusive OR operators; and
   a switch for selecting one of the $2^{K-1}$ accumulators by regarding the outputs of the register as an address of the accumulators and inputting the output of the multiplexer to the selected accumulator.

3. An apparatus for acquiring a PN code, comprising:
   a PN code generator for generating PN codes of N-bit sequences having K different phases;
   a reference code storage portion for storing one of the K N-bit code sequences generated by the PN code generator;
   N taped delay lines for delaying a received signal N times;
   a multiplier for multiplying the output of the Nth tapped delay lines with the PN codes stored in the reference code register;
   a sub-summer for grouping generated PN codes according to a predetermined regulation, adding the outputs of the multiplier in each group to each other according to the groups to which the code bits stored in the reference code register belong and obtaining $2^{K-1}$ sub-sums;
   a programmable adder for adding the outputs of the sub-summer to each other according to a predetermined regulation and outputting K correlation values; and
   a discriminator for outputting the PN code having a correlation value larger than a predetermined threshold value among the K correlation values.

4. A direct-sequence code division multiple access (DS-CDMA) receiver for searching a PN code included in a received signal and despreading and demodulating the received signal using the searched PN code, comprising:
   a PN code generator for generating PN codes of an N-bit sequence having K different phases;
   a code synchronizer by code grouping for grouping K PN codes generated by the PN code generator according to a predetermined regulation, determining one of the K PN codes to be a reference code, summing the multiplications of the received signal with the reference code in each group, determining a PN code having a correlation value larger than a threshold value among K correlation values obtained by adding the summed values according to a predetermined regulation to be the PN code included in the received signal, and synchronizing the phase of the determined PN code with the phase of the received signal;
   a despreader for despreading the received signal using the determined PN code; and
   a demodulator for demodulating the despread signal.

5. The DS-CDMA of claim 4, wherein the code synchronizer by code grouping comprises:
   a code acquirer by code grouping for grouping K PN codes according to a predetermined regulation, determining one of the K PN codes to be a reference code, summing the multiplications of the received signal with the reference code in each group, and determining a PN code having a correlation value larger than a threshold value among K correlation values obtained by adding the summed values according to a predetermined regulation to be the PN code included in the received signal; and
   a code tracer for synchronizing the phase of the determined PN code with the phase of the received signal.

6. The DS-CDMA of claim 5, wherein the code acquirer by code grouping comprises:
   a multiplexer for multiplying a received signal by +1 or −1 according to the value of a PN code selected to be a reference code among K PN codes generated by the PN code generator and outputting the multiplication result;
   $2^{K-1}$ accumulators for accumulating the output of the multiplexer according to a predetermined control signal;
   a selector for outputting the control signal so that the output of the multiplexer can input to one of the accumulators according to (K−1) code values excluding the reference code;
   a programmable adder for adding the outputs of the accumulators to each other according to a predetermined regulation and outputting K correlation values; and
   a discriminator for outputting the PN code having a correlation value larger than a predetermined value among the K correlation values.

7. The DS-CDMA of claim 6, wherein the selector comprises:
   (K−1) exclusive OR operators for performing an exclusive OR operation on the reference code and the (K−1) codes;
   a register of (K−1) bits for storing the outputs of the exclusive OR operators; and
   a switch for selecting one of the $2^{K-1}$ accumulators by regarding the outputs of the register as an address of the accumulators and inputting the output of the multiplexer to the selected accumulator.

8. The DS-CDMA of claim 5, wherein the code acquirer by code grouping comprises:
  a reference code storage portion for storing one of the K N-bit code sequences generated by the PN code generator;
  N taped delay lines for delaying a received signal N times;
  a multiplier for multiplying the output of the Nth tapped delay line with the PN code stored in the reference code storage portion;
  a sub-summer for grouping K PN codes according to a predetermined regulation, adding the outputs of the multiplier in each group to each other according to the groups to which the code bits stored in the reference code register belong and obtaining $2^{K-1}$ sub-sums;
  a programmable adder for adding the outputs of the sub-summer to each other according to a predetermined regulation and outputting K correlation values; and
  a discriminator for outputting the PN code having correlation value larger than a predetermined threshold value among the K correlation values.

* * * * *